United States Patent
Munk-Hansen

(10) Patent No.: US 8,734,117 B2
(45) Date of Patent: May 27, 2014

(54) GREASE COLLECTOR, WIND TURBINE NACELLE AND METHOD FOR COLLECTING EXCESS GREASE

(75) Inventor: Thorkil Munk-Hansen, Give (DK)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 13/509,885

(22) PCT Filed: Aug. 20, 2010

(86) PCT No.: PCT/EP2010/062184
§ 371 (c)(1),
(2), (4) Date: May 15, 2012

(87) PCT Pub. No.: WO2011/064002
PCT Pub. Date: Jun. 3, 2011

(65) Prior Publication Data
US 2012/0224963 A1 Sep. 6, 2012

(30) Foreign Application Priority Data
Nov. 24, 2009 (EP) .................. 09014636

(51) Int. Cl.
*F03D 11/00* (2006.01)
(52) U.S. Cl.
USPC .................................. 416/244 A
(58) Field of Classification Search
USPC .......... 415/110, 111; 416/174, 244 A, 244 R; 184/4, 6.12; 277/549, 635; 384/473, 384/475
See application file for complete search history.

(56) References Cited

U.S. PATENT DOCUMENTS

| | | | |
|---|---|---|---|
| 4,174,031 A * | 11/1979 | MacLeod ................. | 198/501 |
| 6,991,378 B2 | 1/2006 | Errard | |
| 2003/0048963 A1 | 3/2003 | Errard | |
| 2003/0066370 A1 | 4/2003 | Russ | |
| 2005/0281499 A1 * | 12/2005 | Wojtkowski et al. ...... | 384/473 |
| 2010/0109333 A1 * | 5/2010 | Teipen ....................... | 290/55 |
| 2010/0124507 A1 | 5/2010 | Dawson | |

FOREIGN PATENT DOCUMENTS

| | | | |
|---|---|---|---|
| CN | 101725463 A | | 6/2010 |
| DE | 102005032627 | * | 8/2006 |
| FR | 2275704 A1 | | 1/1976 |
| JP | 2004-245158 | * | 9/2004 |

OTHER PUBLICATIONS

Kimura et al., Vertical Shaft Wind Mill, Sep. 2, 2004, Abstract of JP2004-245158.*
Paulsen, Wind power plant, has fluid channel arranged inside tower in rotary manner, and fluid channel rotating outside tower, where fluid collected by channels is downwardly discharged by down pipe into oil separator, Aug. 3, 2006, Abstract of DE102005032627.*

* cited by examiner

*Primary Examiner* — Edward Look
*Assistant Examiner* — Liam McDowell

(57) ABSTRACT

A grease collector is described, which is connectable to a wind turbine nacelle. The grease collector includes a channel with a flexible side portion for providing a sealing between the nacelle and a wind turbine tower. Moreover, a wind turbine nacelle and a wind turbine with a grease collector and a method for collecting excess grease which is emitted from a yaw system of a wind turbine are provided.

11 Claims, 4 Drawing Sheets

GREASE COLLECTOR, WIND TURBINE NACELLE AND METHOD FOR COLLECTING EXCESS GREASE

CROSS REFERENCE TO RELATED APPLICATIONS

This application is the U.S. National Stage of International Application No. PCT/EP2010/062184 filed Aug. 20, 2010, and claims the benefit thereof. The International Application claims the benefits of European Patent Application No. 09014636.6 EP filed Nov. 24, 2009. All of the applications are incorporated by reference herein in their entirety.

FIELD OF INVENTION

The present invention relates to a grease collector which is connectable to a wind turbine nacelle. It further relates to a wind turbine nacelle and to a wind turbine. Furthermore, the present invention relates to a method for collecting excess grease which is emitted from a yaw ring of a wind turbine.

BACKGROUND OF INVENTION

Up to now two rubber sealings have been used to seal the connection between the nacelle and the tower in order to avoid that grease from the yaw system is running down the tower. Furthermore, the sealing is used to keep a closed environment in the nacelle. The rubber sealing consists of one circular rubber sealing mounted on the top of the tower and one part mounted on the nacelle respectively (see FIG. 2).

The nacelle is installed on top of the tower by lifting and lowering the nacelle down on to the tower. However, the rubber sealings need to be heeled over each other in order to get the right order of the rubber sealings. This task is time consuming as the turbine needs to be yawed whereby and the rubber sealing is heeled each other similar to when removing a tire from a wheel rim. Furthermore, yawing of the turbine is not possible before the turbine is connected to the grid and it could easily take a couple of days before the installation of the tower sealing can be completed.

The sealing prevents grease from running down the tower but is doesn't keep track of the grease inside the nacelle.

SUMMARY OF INVENTION

It is a first objective of the present invention to provide a grease collector which overcomes the above mentioned disadvantages. It is a second objective of the present invention to provide a wind turbine nacelle which overcomes the above mentioned disadvantages. It is a third objective of the present invention to provide an advantageous wind turbine which overcomes the above mentioned disadvantages. It is a fourth objective of the present invention to provide a method for collecting excess grease which is emitted from a yaw ring of a wind turbine, which overcomes the above mentioned disadvantages.

The objects are solved by a grease collector, a wind turbine nacelle, a wind turbine, and by a method for collecting excess grease which is emitted from a yaw ring of a wind turbine as claimed in the independent claims The depending claims define further developments of the present invention.

The inventive grease collector is connectable to a wind turbine nacelle. The grease collector comprises a channel with a flexible side portion for providing a sealing between the nacelle and a wind turbine tower. By means of the inventive grease collector grease which is emitted from a yaw system can be collected in the channel or tray which keeps track of the grease until it is collected by a service technician.

Preferably the flexible side portion can provide and maintain a tight seal between the nacelle and a wind turbine tower. For example, the grease collector may comprise a circular channel or tray made of a flexible material such as plastic where one side of the channel or tray is prepared to engage with a wearing surface of the tower in order to achieve a tight sealing between the tower and the nacelle. The circular channel or tray can extend around the circumference of the tower.

The inventive grease collector may comprise a number of segments. The segments may overlap each other. For instance, adjacent segment may overlap each other in circumferential direction relating to the tower. A segmented grease collector has the advantage, that the segments can easily and separately be mounted and removed.

Generally, the grease collector may comprise plastic material, such as ABS plast (Acrynitril Butadien Styren terpolymer). Advantageously, at least the flexible side portion comprises or consists of plastic material. Preferably, the whole grease collector or the channel can be made of plastic such as ABS plast or a similar material. Manufacturing of the grease collector or at least of the channel may preferably be done by extruding.

Furthermore, the grease collector can comprise a wiper for wiping of excess grease. Moreover, the grease collector may comprise a container for storing excess grease. For example, the grease collector can be connected to a small container where excess grease is stored in such a way that excess grease is removed by exchanging or empting the container.

The inventive wind turbine nacelle comprises a grease collector as previously described. Preferably the grease collector may be connected to the nacelle, for example by means of bolts or screws. The inventive wind turbine nacelle has the same advantages as the inventive grease collector.

The inventive nacelle may comprise a yaw ring. The grease collector can advantageously be positioned below the yaw ring. If the grease collector is positioned below the yaw ring, excess of grease from lubrication of the yaw system can be collected in the channel or tray.

The inventive wind turbine comprises a wind turbine nacelle as previously described. The inventive wind turbine has the same advantages as the inventive wind turbine nacelle.

The inventive wind turbine may comprise a wind turbine tower. At least part of the flexible side portion of the grease collector can preferably be abutted on the surface of the tower for achieving a sealing, especially for achieving a tight sealing. Advantageously, the wind turbine tower comprises a wearing surface and the flexible side portion may be abutted on the wearing surface. Preferably the flexible side portion surrounds the wind turbine tower about its circumference.

The inventive wind turbine nacelle and the inventive wind turbine have the following advantages: Excess of grease from lubrication of the yaw system can be collected in a channel or tray. The grease collector can be installed in the production facility. No extra installation work is needed on the side where the wind turbine is installed. The channel or tray also serves as a tight sealing between the tower and the nacelle due to the flexible side portion of the channel or tray.

The inventive method for collecting excess grease which is emitted from a yaw system, especially from a yaw ring of a wind turbine, is characterized in placing a grease collector as previously described below the yaw system, especially directly below the yaw ring. Excess grease is led into the channel or tray of the grease collector. Furthermore, the excess grease can be led into a container and/or can be wiped off. The excess grease can be stored in the container. The excess grease can be removed by exchanging or empting the container.

Placing a grease collector below the yaw system, especially below the yaw ring and leading excess grease into the channel of the grease collector prevents grease from running down the tower and from running down inside the nacelle without keeping track. Furthermore, the removed excess grease may be recycled or reused.

Generally, the present invention provides a grease collector for collecting grease from the yaw system combined with a tight sealing between the tower and the nacelle.

Further features, properties and advantages of the present invention will become clear from the following description of an embodiment in conjunction with the accompanying drawings. All mentioned features are advantageous alone and in any combination with each other.

DETAILED DESCRIPTION OF INVENTION

An embodiment of the present invention will now be described with reference to FIGS. 1 to 7.

Figure 1:
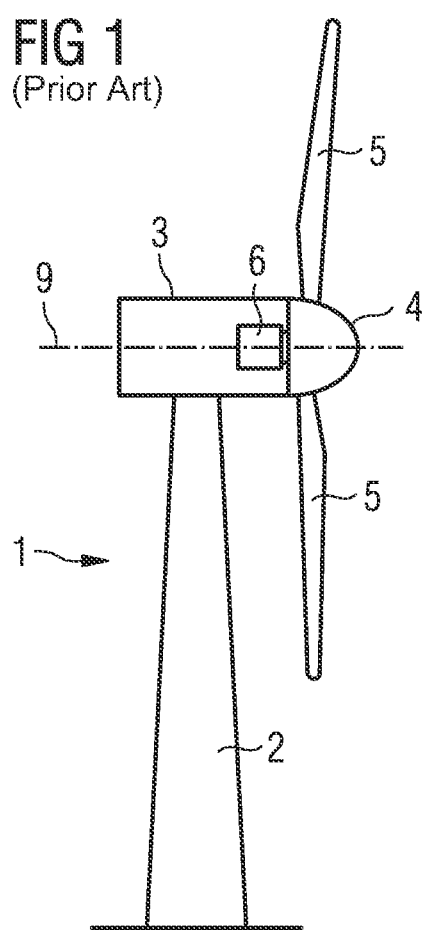
FIG. 1 schematically shows a wind turbine.

FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 5. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine.

Figure 2:
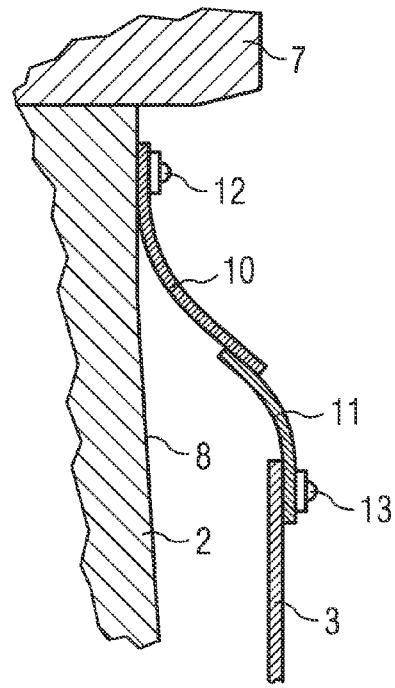
FIG. 2 schematically shows part of a sealing arrangement between the tower and the nacelle according to the state of the art in a sectional view.

FIG. 2 schematically shows a known sealing arrangement between the tower 2 and the nacelle 3 in a sectional view. The nacelle 3 comprises a yaw ring 7. A first rubber sealing 11 is connected to the nacelle 3 by means of a screw or bolt 13. The first rubber sealing 11 extends around the circumference of the tower 2. A second rubber sealing 10 is connected to the tower 2 by means of a screw or bolt 12. The second rubber sealing 10 is connected to the outer surface of the tower 2 such that it extends around the circumference of the tower 2. The second rubber sealing 10 overlaps the first rubber sealing 11 which is connected to the nacelle 3.

Grease which is emitted from the yaw ring 7 will run from the yaw ring 7 down to the bottom of the nacelle 3 guided by the rubber sealings 10 and 11. During installation of the wind turbine 1 the second rubber sealing 10 attached to the tower 2 needs to be heeled over the first rubber sealing 11 after the installation of the nacelle 3.

Figure 3:
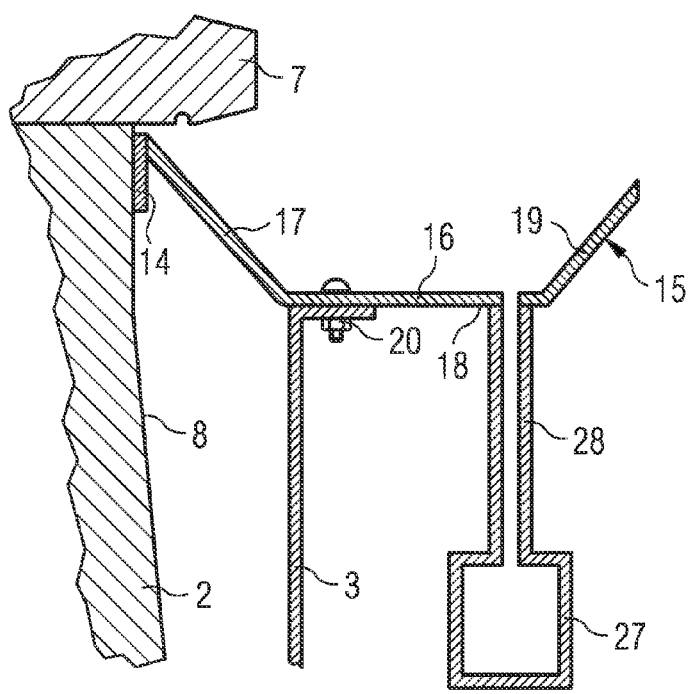
FIG. 3 schematically shows part of an inventive wind turbine in a sectional view.

FIG. 3 schematically shows part of an inventive wind turbine with an inventive grease collector 15 in a sectional view. The nacelle 3 comprises a grease collector 15. The grease collector 15 is connected to the nacelle 3 by means of a screw or bolt and nut 20. The nacelle 3 comprises a yaw system with a yaw ring 7.

The inventive grease collector 15 has the form of a channel or tray 16 which extends about the circumference of the tower 2. The channel 16 comprises a bottom portion 18 and two side portions 17 and 19 which are connected to the bottom portion 18. The first side portion 17 is facing towards the tower 2. This first side portion 17 is flexible. For example, it is made of plastic such as ABS plast (Acrylnitril Butadien Styren terpolymer) or similar. The second side portion 19 is located opposite to the first flexible side portion 17 relating to the bottom portion 18. Generally, the whole grease collector 15 or the whole channel 16 can comprise flexible material such as plastic, for example ABS plast (Acrylnitril Butadien Styren terpolymer), or it may be made of the formerly mentioned material. Manufacturing of the grease collector 15 is preferably done by extruding.

The tower 2 comprises an outer surface 8. The tower 2 further comprises a wearing surface 14 at the outer surface 8. The wearing surface 14 is located such that after installation of the wind turbine the flexible side portion 17 touches the wearing surface 14. Hereby, a tight seal is provided between the flexible side portion 17 and the wearing surface 14 of the tower 2. This means that the flexible side portion 17 provides and maintains a tight sealing between the tower 2 and the nacelle 3.

Grease which is emitted from the yaw ring 7 drops or flows along the flexible side portion 17 into the channel 16 formed by the greased collector 15. For example, the grease collector 15 can comprise a wiper in order to get the excess grease wiped out of the channel 16. Alternatively, the grease collector 15 may be connected to a small container 27 by means of a pipe 28 or flow channel. In the container 27 excess grease is stored in such a way that excess grease can be removed by exchanging or emptying the container 27.

Figure 4:
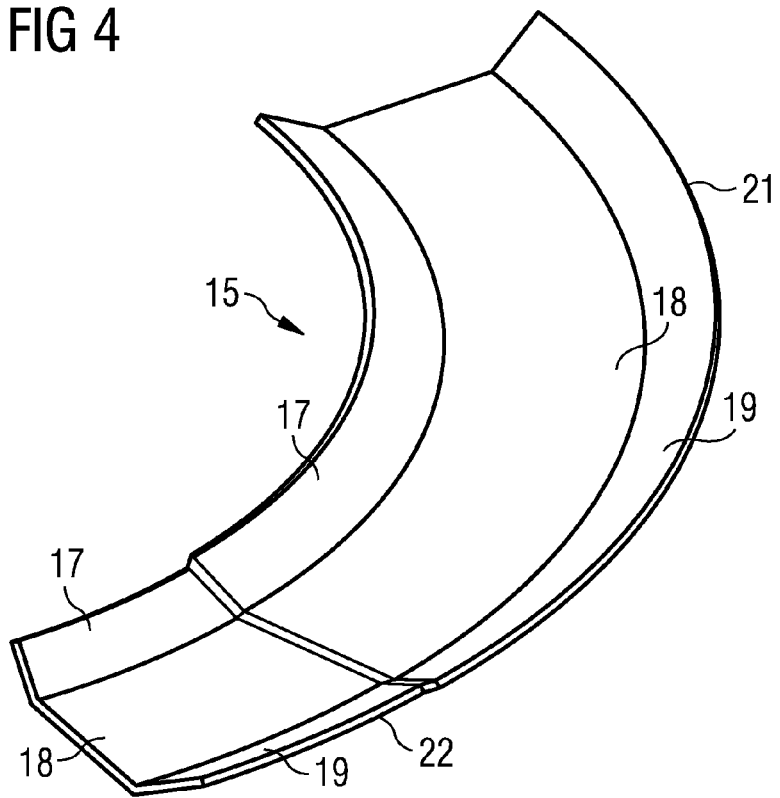
FIG. 4 schematically shows part of an inventive grease collector in a perspective view.

FIG. 4 schematically shows part of an inventive grease collector 15 in a perspective view. The grease collector 15 comprises a number of segments. In FIG. 4 a first segment 21 and a second segment 22 are shown. Each of the segments 21 and 22 comprises a formerly described first flexible side portion 17, a bottom portion 18 and a second side portion 19. The segments 21 and 22 are connected to each other such that they overlap each other in a direction along the circumference of the wind turbine tower 2.

Figure 5:
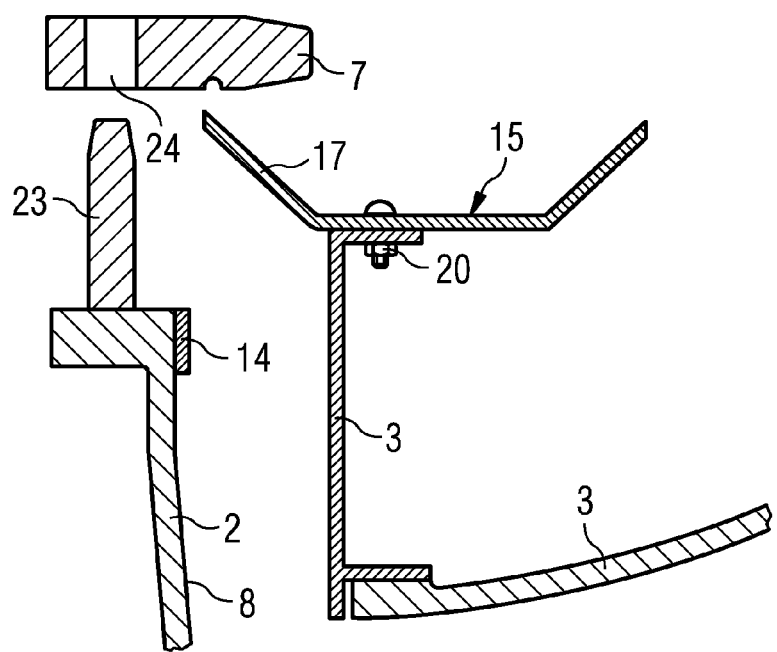
FIG. 5 schematically shows the installation of an inventive wind turbine nacelle on top of a wind turbine tower in a sectional view.

FIG. 5 schematically shows part of the nacelle 3 and part of the tower 2 during installation of the nacelle 3 on top of the tower 2. The tower 2 comprises a number of mandrels 23. The mandrels 23 are placed on top of the tower 2. The yaw ring 7 of the nacelle 3 comprises a number of openings 24. Each opening 24 corresponds to a mandrel 23 which is inserted into the particular opening 24 during installation. During the installation process the nacelle 3 is lowered on top of the tower 2. The mandrels 23 are used to guide the nacelle 3 in place. The flexibility of the grease collector or tray 15, especially the flexibility of the flexible side portion 17, ensures a tight sealing between the tower 2 and the nacelle 3. This tight sealing is ensured without extra work. Compared with the known sealing arrangement, which is described in conjunction with FIG. 2, no rubber sealings need to be heeled over each other in order to get the right order of the rubber sealings.

Figure 6:
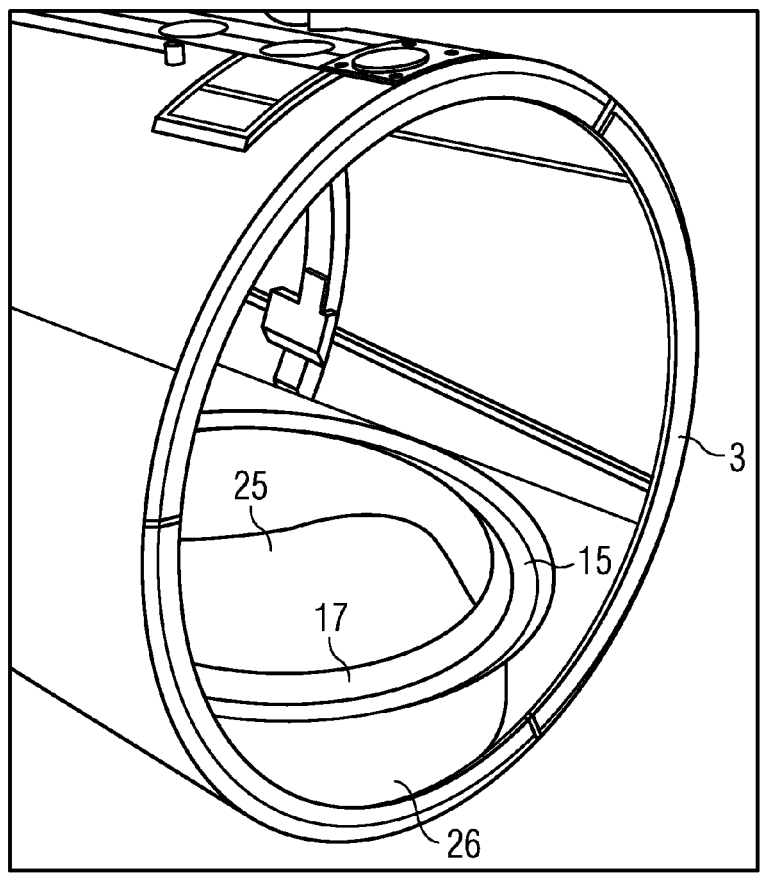
FIG. 6 schematically shows part of an inventive wind turbine nacelle in a perspective view.

FIG. 6 schematically shows part of an inventive nacelle 3 in a perspective view. The nacelle 3 comprises an opening 25 with a circular flange 26 for connecting the nacelle 3 to the tower 2. The circular flange 26 comprises an inventive grease collector 15. The grease collector 15 may be connected to the circular flange 26 by means of screws or bolts. The flexible side portion 17 is located such that it is facing towards the opening 25.

Figure 7:
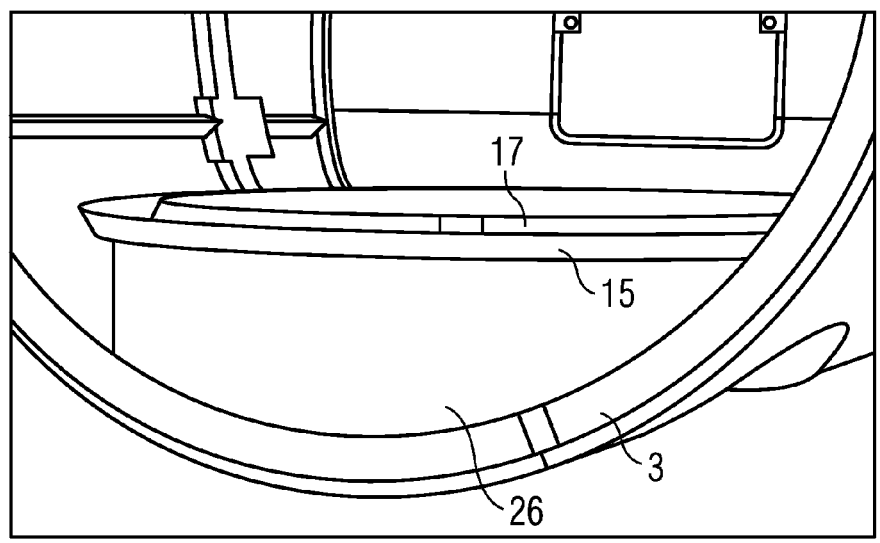
FIG. 7 schematically shows part of an inventive wind turbine nacelle in a perspective view.

FIG. 7 shows an alternative perspective view of the inventive nacelle 3 which is shown in FIG. 6. The inventive grease collector 15 collects the excess grease emitted from the yaw ring 7 and at the same time provides a sealing between the tower 2 and the nacelle 3 by means of the flexible side portion 17.

The invention claimed is:

1. A grease collector which is connectable to a wind turbine nacelle situated on a wind turbine tower, the grease collector comprising:
    an annular channel formed from a plurality of segments including a bottom portion, a flexible side portion attached to the bottom portion, and a second side portion attached to the bottom portion, the flexible side portion arranged on a radially inward opening of the annular channel, the flexible side portion effective to abut to and surround the outside of the wind turbine tower, the flexible side portion effective to provide a seal between the wind turbine nacelle and the wind turbine tower,
    wherein the flexible side portion and the second side portion both angle upward from the bottom portion to form the annular channel.

2. The grease collector as claimed in claim 1,
    wherein the grease collector is formed from plastic material.

3. The grease collector as claimed in claim 1, further comprising a container for storing excess grease.

4. A wind turbine with a nacelle arranged on a wind turbine tower, comprising:
    a grease collector which comprises an annular channel formed from a plurality of segments including a bottom portion, a flexible side portion attached to the bottom portion, and a a second side portion attached to the bottom portion, the flexible side portion arranged at a radially inward opening of the annular channel, the flexible side portion abuts and surrounds the wind turbine tower, the flexible side portion effective for providing a sealing between the wind turbine nacelle and the wind turbine tower,
    wherein the flexible side portion and the second side portion both angle upward from the bottom portion to the form the annular channel.

5. The wind turbine as claimed in claim 4,
    wherein the grease collector is connected to the wind turbine nacelle by bolts or screws.

6. The wind turbine as claimed in claim 4,
    wherein the wind turbine nacelle comprises a yaw ring and the grease collector is positioned below the yaw ring.

7. The wind turbine as claimed in claim 4,
    wherein the wind turbine tower comprises a wearing surface, wherein the flexible side portion is abutted on the wearing surface.

8. The wind turbine as claimed in claim 4,
    wherein the flexible side portion of the grease collector surrounds the wind turbine tower about a circumference of the wind turbine tower.

9. A method for collecting excess grease which is emitted from a yaw system of a wind turbine, comprising:
    placing a grease collector below the yaw system, the grease collector comprises an annular channel formed from a plurality of segments including a bottom portion, a flexible side portion attached to the bottom portion, and a second side portion attached to the bottom portion, the flexible side portion arranged at a radially inward opening of the annular channel, the placing includes abutting the flexible side portion, which surrounds a wind turbine tower, with the wind turbine tower, the flexible side portion abutted to the wind turbine tower acts as a seal between the wind turbine nacelle and the wind turbine tower,
    leading excess grease into the channel of the grease collector by the flexible side portion,
    wherein the flexible side portion and the second side portion both angle upward from the bottom portion to form the annular channel.

10. The method as claimed in claim 9,
    wherein the excess grease is led into a container.

11. The method as claimed in claim 10,
    wherein the excess grease is removed by exchanging or emptying the container.

\* \* \* \* \*